United States Patent [19]

Mukai et al.

[11] Patent Number: 5,196,877
[45] Date of Patent: Mar. 23, 1993

[54] VIEWFINDER FRAMING DEVICE FOR ZOOM LENS CAMERA

[75] Inventors: Hiromu Mukai; Hisashi Tokumaru; Kohtaro Hayashi, all of Osaka, Japan

[73] Assignee: Minolta Camera Kabushiki Kaisha, Osaka, Japan

[21] Appl. No.: 821,128

[22] Filed: Jan. 14, 1992

Related U.S. Application Data

[63] Continuation of Ser. No. 418,492, Oct. 10, 1989, abandoned.

[30] Foreign Application Priority Data

Oct. 12, 1988 [JP] Japan .................................. 63-257953
Oct. 12, 1988 [JP] Japan .................................. 63-257954
Oct. 12, 1988 [JP] Japan .................................. 63-257955

[51] Int. Cl.$^5$ ............................................. G03B 13/36
[52] U.S. Cl. .............................. 354/195.12; 354/289.1; 354/222
[58] Field of Search ........... 354/471, 474, 475, 195.12, 354/199, 222, 289.1, 219, 195.1, 195.13, 195.11

[56] References Cited

U.S. PATENT DOCUMENTS

| 3,212,422 | 10/1965 | Nerwin et al. | 354/222 |
| 4,711,547 | 12/1987 | Iizuka | 354/289.1 |
| 4,812,912 | 3/1989 | Iida et al. | 354/402 |
| 4,884,089 | 11/1989 | Taniguchi et al. | 354/222 |
| 4,951,075 | 8/1990 | Tokumaru et al. | 354/195.1 |

FOREIGN PATENT DOCUMENTS 58-219505 12/1983 Japan .
59-67505 4/1984 Japan .
63-17420 1/1988 Japan .
63-66519 3/1988 Japan .

OTHER PUBLICATIONS

"Asahi Camera" article, published in May 1988, pp. 220 to 228.

Primary Examiner—Michael L. Gellner
Assistant Examiner—Cassandra C. Spyrou
Attorney, Agent, or Firm—Price, Gess & Ubell

[57] ABSTRACT

A camera which has a photo-taking lens capable of zooming, and a viewfinder which shows a first photographing range and a display which displays one frame defining a second photographing range smaller than the first photographing range, wherein out of photographing range showing mode is provided. And when the out of photographing range mode is selected, after zooming operation is carried out, the second photographing range is exposed on a film, whereby the visual field in the finder can be enlarged and, provided that a camera has a focus detector, the focus detecting area can be relatively enlarged.

16 Claims, 7 Drawing Sheets

VIEWFINDER FRAMING DEVICE FOR ZOOM LENS CAMERA

This is a continuation of application Ser. No. 418,492, filed on Oct. 10, 1989, now abandoned for a CAMERA.

BACKGROUND OF THE INVENTION AND RELATED ART STATEMENT

1. Field of the Invention

The present invention relates to a camera which has a zoom lens or to which a zoom lens is attachable, and in particular to enlarging a visual field of a finder as compared with real photographing range and a focus detecting area in the abovementioned camera.

2. Description of the Prior Art

In a camera, enlarging a visual field of a finder as compared with real photographing range is preferable because a position of an object (especially a moving object) can be observed before the object comes into the real photographing range.

However, in a conventional single lens reflux camera, the photographing range approximately corresponds to the visual field of its finder, therefore the finder coverage (visual field of finder/photographing range) is usually 90% to 100%. This is because, with the finder coverage being enlarged, the finder optical system becomes large to fail in obtaining a small-sized camera, and further, the performance of a photo-taking lens is not assured outside the photographing range.

There are many cases in which information of an object outside the photographing range field are required. For example, a composition of a photographic scene is determined based on the information and a photographer is on stand by to take a picture before a moving object comes into the photographing range and is waiting for a shutter release opportunity.

Further, if the focus detecting area is enlarged, focus detection can be achieved even if the main object gets out of the center of the photographing scene, so that a composition can be selected more freely and it is advantageous for a photographer.

However, in order to enlarge the focus detecting area, usually a focus detecting module comprising a focus detecting optical system, a light receiving element, for example, a CCD line sensor has necessarily to be also large-sized, which makes it difficult to obtain a camera having a preferable compact structure and design.

In this connection, the applicant of this invention has proposed in U.S. patent application Ser. No. 389,908 that at the focus detecting time, the focus detecting area is enlarged by setting the focal length of a photo-taking lens at the shortest end. However, in this preceding application, the focal length returns from the shortest end to the former focal length by manual operation of a photographer, and further, the relation between the focus detecting areas at the times of finder observation and photographing respectively is not referred to, so that it is difficult to grasp the relation between the visual field of the finder and the real photographing range when the focal length of the photo-taking lens is at the shortest end.

SUMMARY OF THE INVENTION

A first object of the present invention is to provide a camera in which a visual field in a finder outside a photographing range can be observed.

A second object of the present invention is to provide a camera in which the focus detecting area can be enlarged without also making increasing the size of a focus detecting module comprising a focus detecting optical system, a CCD line sensor and the like.

A third object of the present invention is to provide a camera in which the visual field of a finder actually used in photographing and the focus detecting area actually used in focus detection can be displayed at all times.

DETAILED DESCRIPTION OF THE PREFERRED EMBODIMENTS

An optical system of an embodiment of a single lens reflex camera according to the present invention will be now described in the following with reference to FIG. 1 of the appended drawings.

A photo-taking lens 1 is a zoom lens of the so-called four-component type. A quick return mirror 2 positioned behind the photo-taking lens 1 has a function of dividing incident light into light for use in a finder and light for use in an AF sensor module 8 for detecting a focus condition of the photo-taking lens. On the side of the finder, there are provided a focusing screen 3, on which a real image is formed, in a position spaced equally to a film surface from the quick return of reflex mirror 2, a display device 4 for displaying a visual field frame indicating the photographing range and a focus detecting area, a pentaprism 5 and an eye piece 6. The visual field frame can be displayed on the display device 4 by means of, for example, a LCD (Liquid Crystal Display) or an ECD (Electrochromic Display). On the side of the AF sensor module 8, there are provided a submirror 7 for guiding light to the AF sensor module 8 comprising a CCD and the like.

Figure 2:
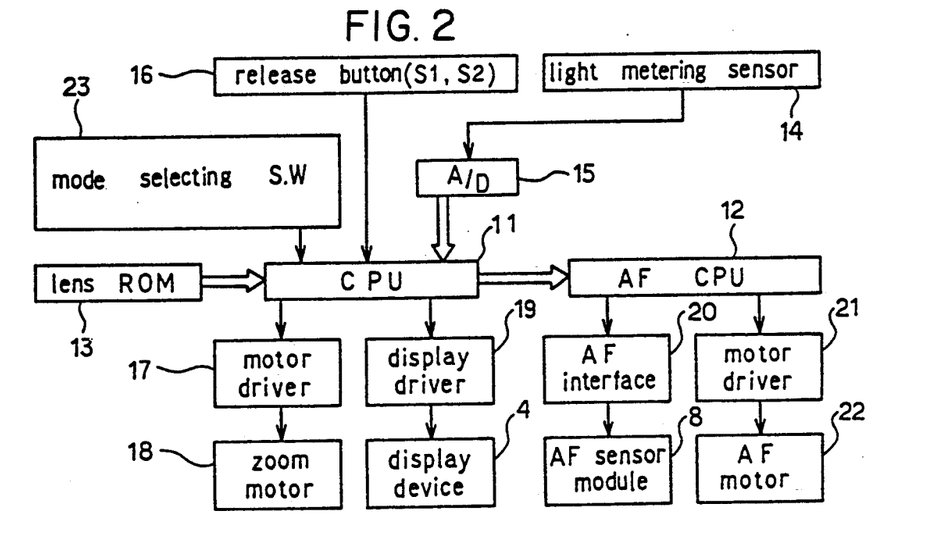
FIG. 2 shows a control system of the camera of FIG. 1.

Now, a control system for the camera will be described in the following with reference to FIG. 2. This control system comprises a CPU 11 for controlling the operatives of the camera, an AFCPU 12 for an autofocusing operation, and a lens ROM 13 which data peculiar to the photo-taking lens 1 are stored. In this control system, data stored in the lens ROM 13 are inputted into the CPU 11, and a light metering signal outputted from a light metering sensor 14 for automatic exposure (AE) is inputted, through an A/D converter 15, into the CPU 11. A signal given by operating a release button 16 provided in the camera is inputted into the CPU 11. When the release button 16 is pressed halfway, a light metering and focus detecting switch S1 is turned on, and when the release button 16 is pressed all the way down, a release switch S2 is turned on, so that the shutter is opened and closed to execute photographing.

A zoom motor 18 for zooming the photo-taking lens 1 is driven, through a zoom motor driver 17, by an output of the CPU 11. Further, display device 4 in the finder is driven, through a driver 19, also by an output of the CPU 11. A signal from the AF sensor module 8 is transmitted through an AF interface 20 into the AFCPU 12, and an AF motor 22 is driven, through an AF motor driver 21, by an output of the AFCPU 12. Further, there is provided a mode selecting switch 23 for giving an instruction to selecting an output of a photographing range showing mode to the CPU 11.

Now, the visual field frame in the finder seen through the eyepiece 6 will be described with reference to FIG. 3. The visual field frame comprises a usual visual field frame "a" which defines the photographing range according to the set focal length condition of the photo-taking lens 1, an inner visual field frame "b" smaller than the abovementioned usual visual field frame "a", and a focus detecting area "c". An area defined by the inner visual field frame "b" corresponds to the photographing range in the out of photographing range showing mode. These visual field frames are displayed by the abovementioned display device 4.

Focus detection operation is executed before the releasing operation. When the out of photographing range showing mode is set, the visual field frame "a" at that time is wider than the practical photographing range. After that, when the releasing operation is executed, a zooming operation in the direction of longer focal length in the photo-taking lens 1 and photographing is executed within the range of the inner visual field frame "b". Thus, the visual field outside of the actual photographing range can be observed in the finder, and at the same time the focus detecting area can be relatively enlarged.

In connection with this, the inner visual field frame "b" is not necessarily displayed at all times but it may be displayed only when the out of photographing range showing mode is selected.

Figures 3, 4:
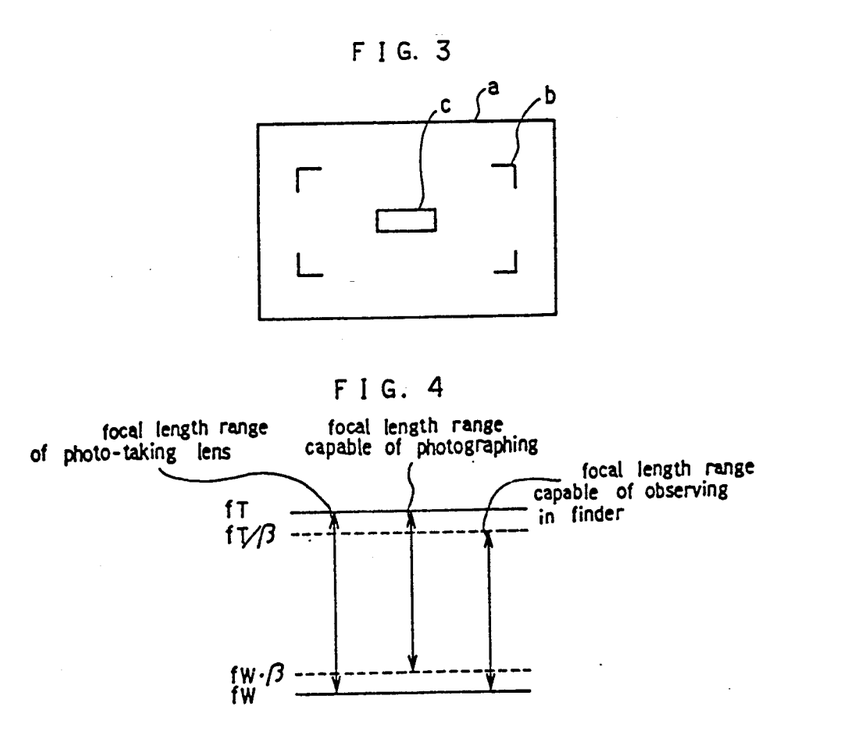
FIG. 3 shows a visual field of a finder seen through an eyepiece.
FIG. 4 shows a relation of the focal length range of a photo-taking lens including, the focal length range capable of photographing and the focal length range capable of observing in the finder.

Further, the relation of the focal length range of the photo-taking lens 1, the focal length range capable of photographing and the focal length range capable of observing in the finder is such as shown in FIG. 4, and the out of photographing range showing mode cannot be executed throughout the whole range of the focal length of the photo-taking lens 1. For example, when a ratio of the visual field frame "b" to the visual field frame "a" is represented by $\beta$ ($\beta = a/b$), and the shortest and longest focal length of the photo-taking lens 1 are represented by $f_W$ and $f_T$, the focal length range capable of photographing in the out of photographing range showing mode is $f_W \cdot \beta$ to $f_T$, while the focal length range capable of observing in the finder in the out of photographing range showing mode is $f_W$ to $f_T/\beta$.

Consequently, if the focal length of the photo-taking lens 1 has been set within a range from $f_T/\beta$ to $f_T$, and then the out of photographing range showing mode is selected, the photo-taking lens 1 is automatically set at the focal length $f_T/\beta$. After that, a photographer determines a composition of a picture within a range from $f_W$ to $f_T/\beta$.

Figure 5:
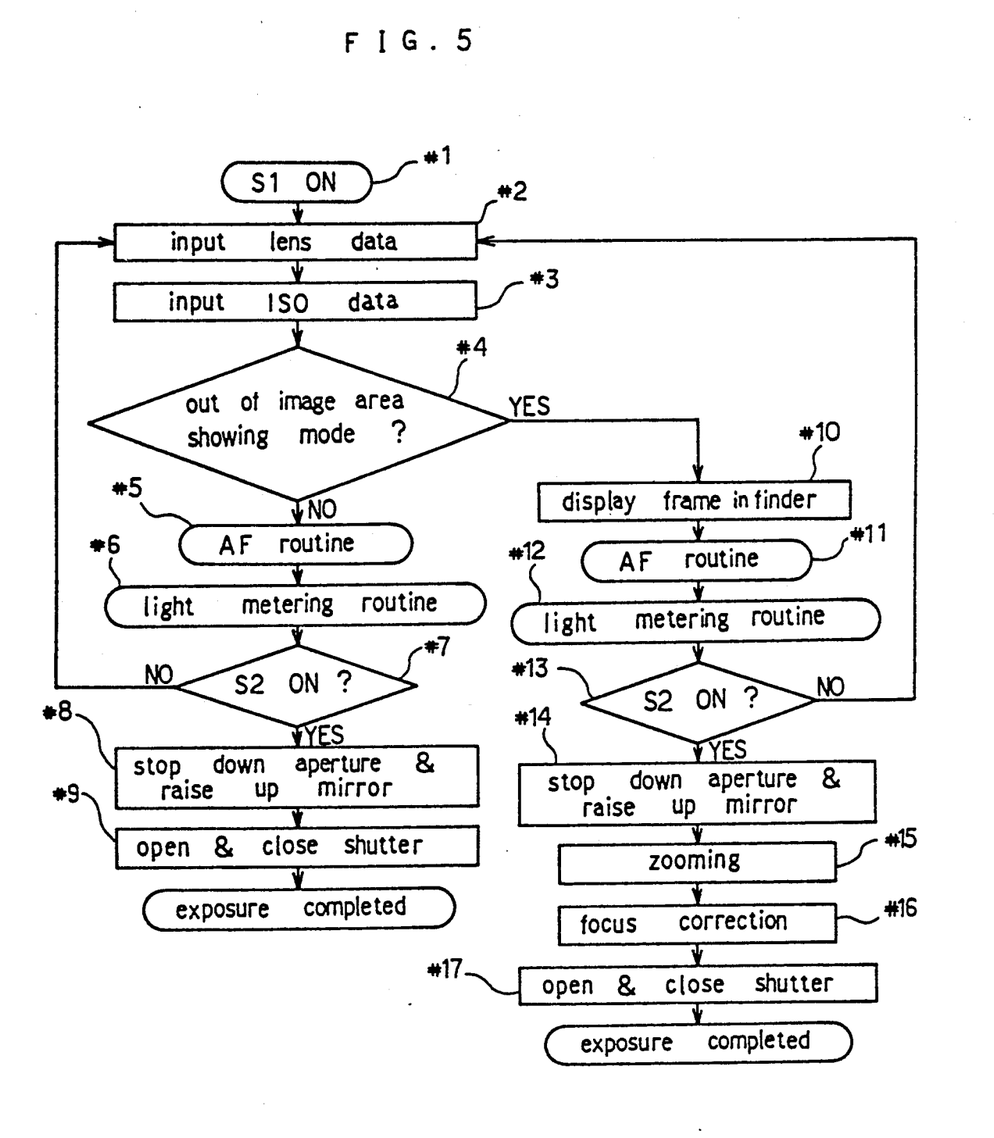
FIG. 5 is a flow chart of a sequence of operation of the camera of FIG. 1.

Now, a sequence of operation of this camera by means of the abovementioned CPU 11, AFCPU 12 and the like will be described in the following with reference to a flow chart of FIG. 5.

Firstly, when the release button 16 is pressed halfway, the light metering and focus detecting switch S1 is turned ON and the camera is started to operate (step #1). Then, data peculiar to the photo-taking lens 1, for example, the focal length, aperture value and the like stored in the lens ROM 13 are inputted into the CPU 11 (step #2). Then, the film sensitivity (ISO) data determined based on a DX code or a manually set is inputted into the CPU 11 (step #3).

Nextly, it is detected whether the out of photographing range showing mode (hereinafter referred to as AFM) is selected or not (step #4). When a usual mode, not the AFM mode, is selected, the program goes into AF routine of step #5, in which focus detection data are inputted from the AF sensor module, the focus of the photo-taking lens 1 being adjusted, and further, the program goes into a light metering routine, in which light metering data are inputted from the light metering sensor 14 and an aperture value and a shutter speed are determined so as to obtain a correct exposure (step #6).

After that, the control system waits until the release switch S2 is turned ON by pushing the release button 16 (step #7). When the release switch S2 is turned on, the aperture is stopped down to the aperture value determined as abovementioned and the mirror 2 is up (step #8). When the stop down of the aperture and the mirror-up are completed, a shutter (not shown) is opened, and it is closed after a period determined based on the shutter speed (step #9), whereby the exposure is completed.

When the out of photographing range showing mode is selected by operating the mode selecting switch 23, the program goes, after the abovementioned step #4, to step #10 and the subsequent steps. In this out of photographing range showing mode, firstly the inner visual field frame "b" is displayed (step #10). Steps #11 to #13 subsequent to step #10 are the same as the abovementioned steps #5 to #7. When the release switch S2 is turned on, the aperture is stopped down and the mirror is raised up (step #14).

Then, the CPU 11 operates the zoom motor 18 through the motor driver 17 so as to do a zooming operation, in which a longer focal length than the present focal length is set according to the ratio visual field frame "a". Therefore, the photographing range of the photo-taking lens 1 after the zooming operation corresponds to the area framed by the inner visual field frame "b" before the zooming operation (step #15). Further, when the image point is moved by the abovementioned zooming operation (in the case of the photo-taking lens 1 being a variable focus lens and the like), focus correction is executed (step #16). Then, the shutter is opened and closed similarly at step #9 (step #17), and exposure is completed.

The abovementioned steps #14 to #16 can be controlled at the same time or in the reverse order.

When the out of photographing range showing mode is selected and the abovementioned sequential operations are executed, the visual field in the finder can be enlarged (the finder coverage becoming more than 100%), and besides, the focus detecting area can be relatively enlarged.

Further, in the abovementioned sequence, in the out of photographing range showing mode, the ratio of the visual field frame "b" to the visual field frame "a" is not limited to one but the size of the inner visual field frame "b" may be variable in a plurality of number, and in such a case, a ratio selecting step (not shown) is required just before step #10.

Further, in the abovementioned embodiment, when the out of photographing range showing mode is selected, the inner visual field frame "b" is displayed. However, when the number of the inner visual field frame "b" is small, it is not a nuisance to display the inner visual field frame "b" at all times. In such a case, instead of using a LCD, an ECD and the like as a display device 4, the inner visual field frame area may be drawn on the focus plate 3, or sheets on which the inner visual field frame area is printed, coated by vaporization or drawn in other ways may be arranged instead of a LCD, and ECD and the like, and this is advantageous in respects of the installation space and the cost.

The abovementioned structure can be applied to a lens shutter camera provided with an optical system of a finder having a exclusive object lens different from a photo-taking lens. In this case, it is necessary for the abovementioned optical system of a finder to execute a zooming operation interlockedly with the zooming operation of the photo-taking lens, but in other respects, the structure of the abovementioned embodiments can be applied without any change.

Now, a second embodiment of the present invention will be described in the following with reference to FIG. 6. In the abovementioned first embodiment, when the out of photographing range showing mode is selected, the focus detecting area is also enlarged. In this second embodiment, such an enlarged state of the focus detecting area is displayed in the finder in such a form that a photographer can determine this status.

Figure 1:
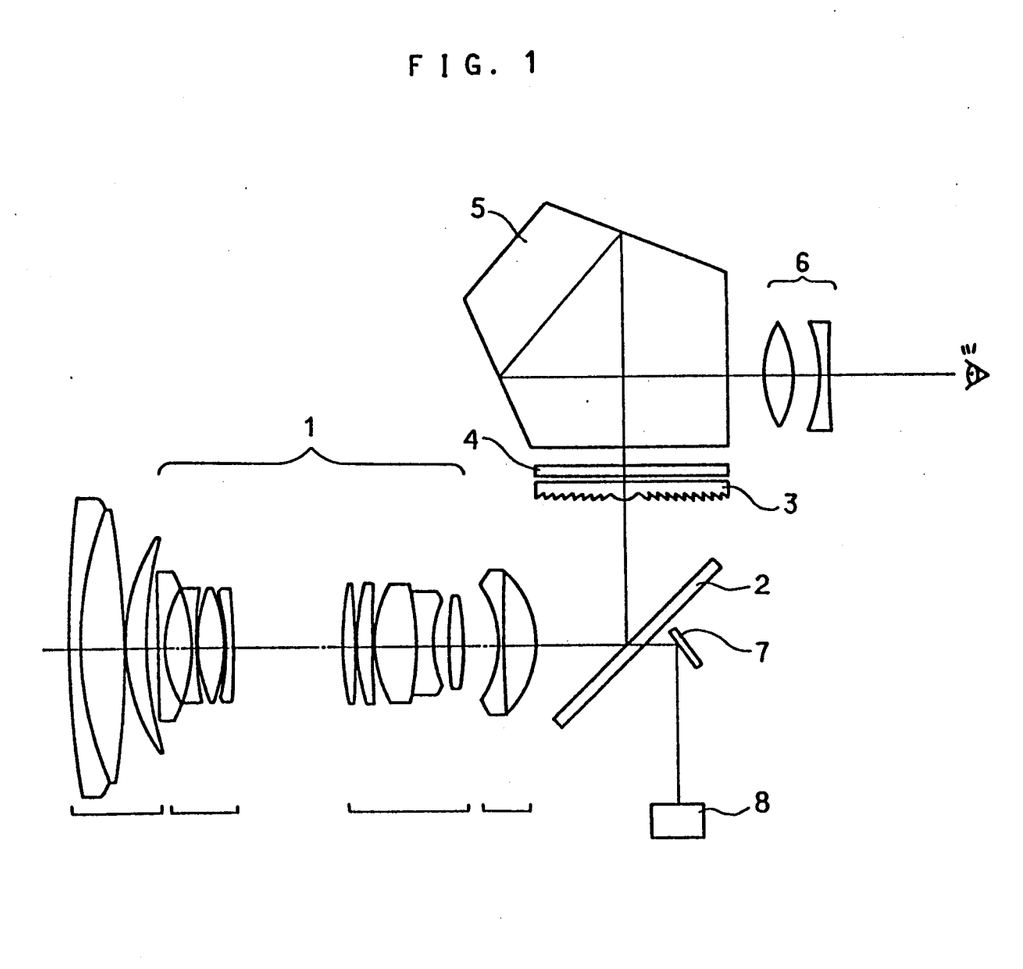
FIG. 1 shows an optical system of an embodiment of a single lens reflex camera according to the present invention.

An optical system of the camera in this embodiment is similar to that of the first embodiment shown in FIG. 1. However, in this second embodiment, an eyepiece 6 is capable of a zooming operation. A control system of the camera in this embodiment is also similar to that of the first embodiment shown in FIG.2. However, a switch 23 in this second embodiment is a switch for giving an instruction of selecting a focus detecting area enlarging mode (described later in detail).

Now, the visual field frame and the focus detecting area in the finder seen through the eyepiece 6 will be described in the following with reference to FIGS. 6 (a), 6(b) and 6 (c). FIGS. 6 (a) and 6 (b) show the relation of the visual field frame "d" of the finder, the focus detecting area "f" and an object when the photo-taking lens 1 is set at the shorter focal length (a) and to the longer focal length (b) with respect to the same object. In this case, since the focus detection is executed through the photo-taking lens, the size of the focus detecting area "f" with respect to the photographing range does not change.

Figure 6A:
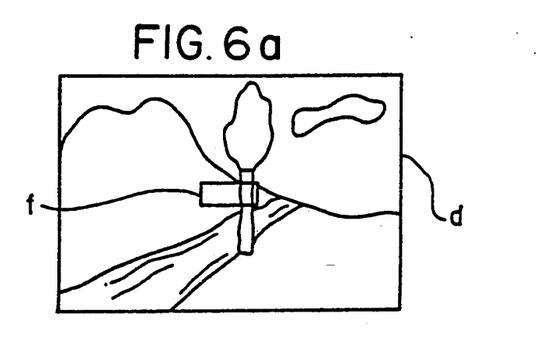
FIGS. 6(a), 6(b) and 6(c) show the visual field of the finder and the focus detecting area seen through an eyepiece.
Figure 6B:
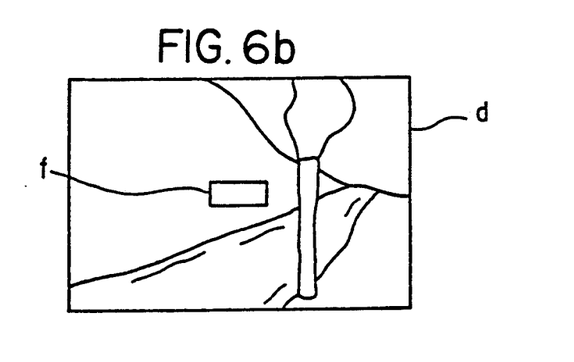
Figure 6C:
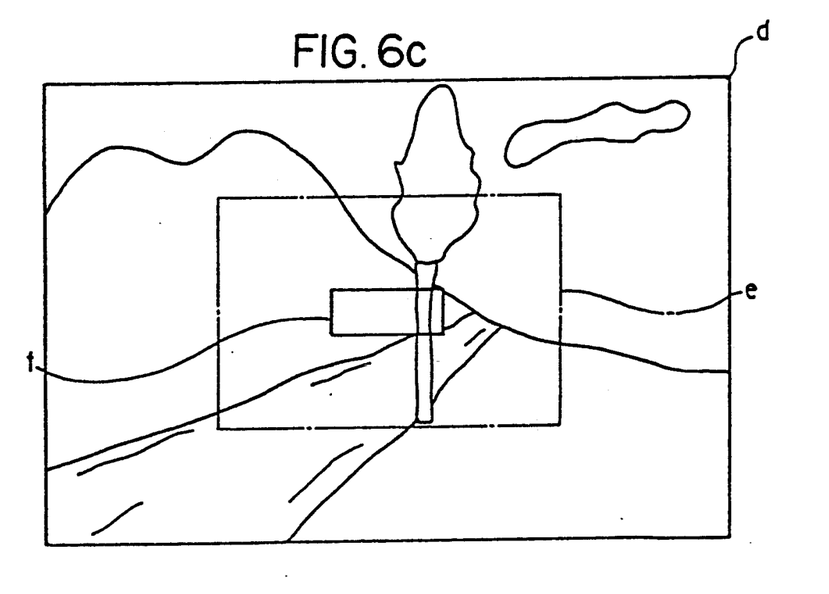

In the focus detecting area enlarging mode, the photographing range of the photo-taking lens is so selected as to be the same with that framed by the visual field frame "d" in the shorter focal length as shown in FIG. 6 (a), and at the same time the eyepiece 6 is zoomed so that an image of the object formed on a focusing screen 3 is enlarged as shown in FIG. 6 (c) (that is, the finder magnification is enlarged).

In this state in which the finder magnification is enlarged, an inner visual field frame "e" is displayed in accordance with the enlargement rate of the finder magnification inside the visual field frame "d". The area of this inner visual field frame "e" is the same as that of the visual field frame "d" in FIG. 6 (b) which corresponds to the photographing range of the practical photographing. The focus detecting area "f" is displayed by means of a display device 4. In the state of FIG. 6 (c), since the size of the eye piece 6 is limited, the peripheral part of the visual field frame "d" cannot be apparently seen. Focus detecting operation is executed with respect to the object in the focus detecting area "f", with the photo-taking lens 1 being set in the shorter focal length in FIG. 6 (a). After that, through a zooming operation, the photographing range of the photo-taking lens 1 corresponds to the area framed by the visual field frame "d" in the longer focal length in FIG. 6 (b), and in this state, photographing is executed.

Figure 7:
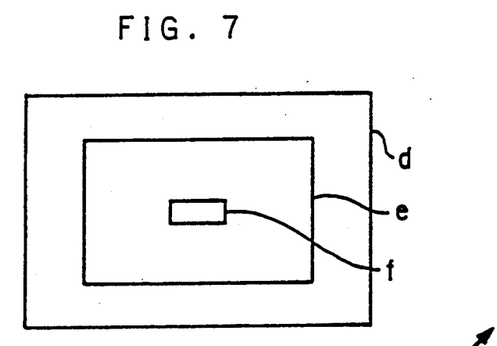
FIG. 7 shows the visual field frame displayed on a display device.

The abovementioned inner visual field frame "e" may be displayed only by a line of the frame as shown in FIG. 7, or by making opaque the space between the inner visual field frame "e" and the visual field frame "d".

Figure 8:
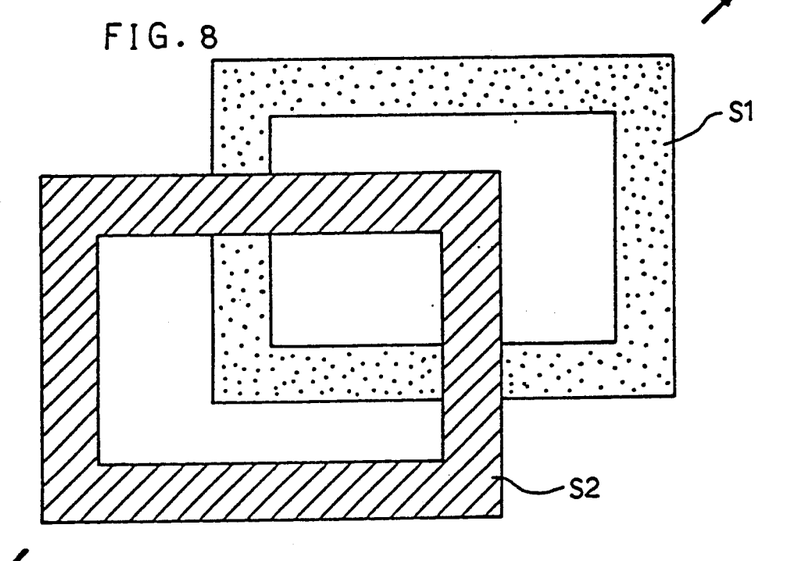
FIG. 8 shows a means for changing the visual field frame.

As a means for changing the size of the visual field frame other than the abovementioned display device 4, a device comprising two sheets S1 and S2 having transparent rectangular inner sections respectively and movable in the opposite directions on a diagonal may be used as shown in FIG. 8. In this case, the visual field frame "d" is not displayed.

The inner visual field frame "e" may be displayed only when the focus detecting area enlarging mode is selected, or may be displayed at all times. In the latter case, a LCD, an ECD and the like as a display device 4 are not used but the inner visual field frame may be drawn directly on a focusing screen 3 or another member on which the inner visual field frame is printed, coated by vaporization or drawn in other method may be used.

Figure 9:
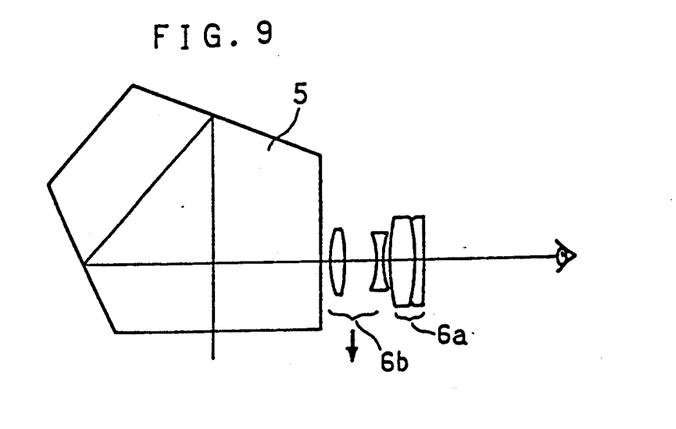
FIG. 9 shows a structure for enlarging the finder magnification in which a lens for enlarging is inserted in the focus detecting area enlarging mode.

Further, in the abovementioned embodiment, the eyepiece 6 is capable of the zooming operation. However, enlargement of the finder magnification may be achieved by inserting lens 6b for magnifying in connection with a fixed eyepiece 6a when the focus detecting area enlarging mode is selected, as shown in FIG. 9.

Further, the relation of the focal length range of the photo-taking lens 1, the focal length range capable of photographing and the focal length range capable of observing in the finder is the same as described above with reference to FIG. 4.

Figure 10:
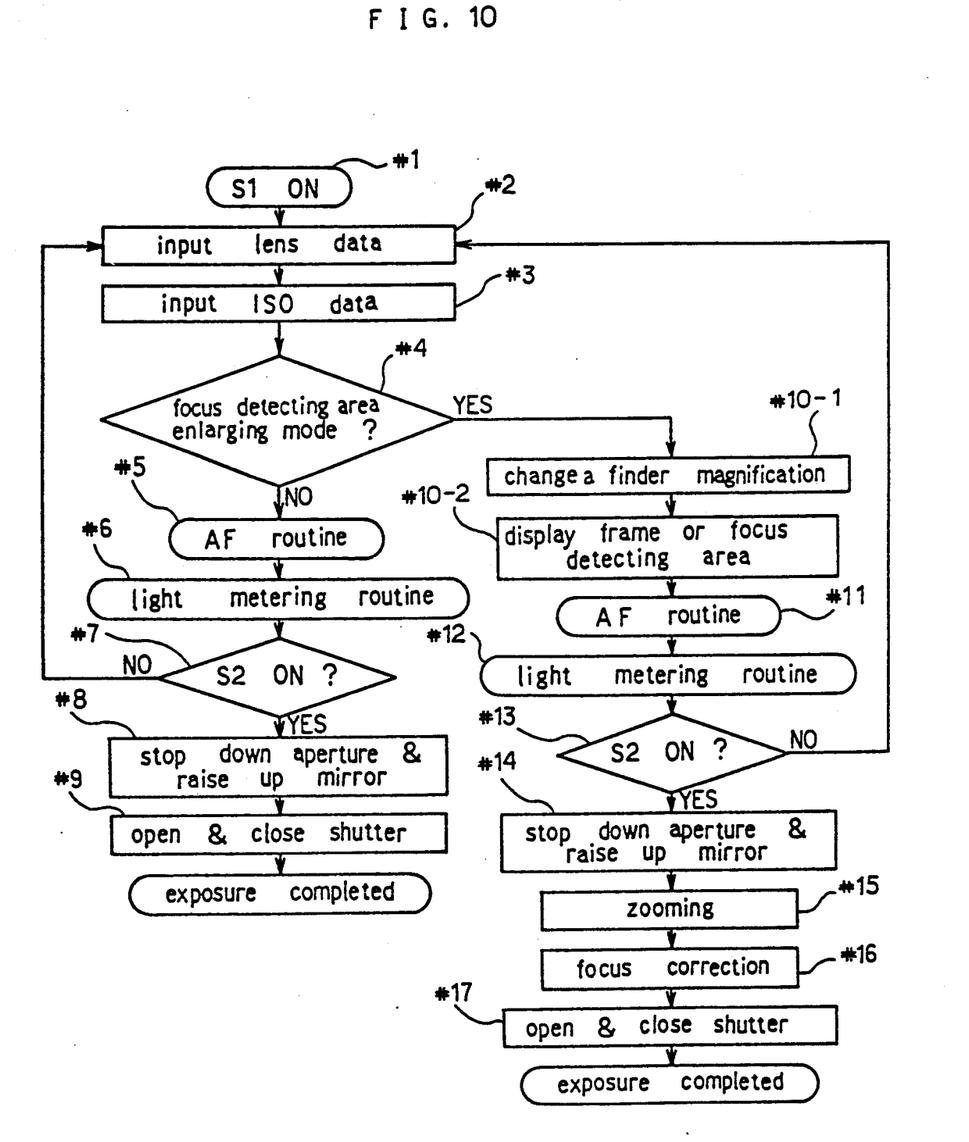
FIG. 10 shows a flow chart of a sequence of operation of a second embodiment of a camera according to the present invention.

Now, a sequence of the operation of a camera of this embodiment by means of the abovementioned CPU 11, AFCPU 12 and the like will be described in the following with reference to a flow chart of FIG. 10. The flow chart of FIG. 10 is substantially the same as the flow chart of FIG. 5. However, when it is judged that the focus detecting area enlarging mode is selected at step #4, the following steps are different from those of the flow chart of FIG. 5.

When the mode switch 23 is operated and the focus detecting area enlarging mode is selected, the program advances to step #10-1 and the following steps. In this mode, firstly the finder magnification is changed by the zooming operation in the eyepiece 6 (step #10-1), and then the inner visual field frame "e" is displayed. The following steps #11 to #17 are the same as those of FIG. 5.

By executing the abovementioned sequential operation, when the focus detecting area enlarging mode is selected, an effect equal to that when the focus detecting area is relatively enlarged can be obtained.

Further, when the focus detecting area enlarging mode is selected, in the abovementioned sequence, the number of the enlargement ratio is not limited to one but the size of the focus detecting area may change in a plurality of number. In such a case, an enlargement ratio selecting step (not shown) is required just before at step #10-1.

Further, a third embodiment of the present invention will be described which is a lens shutter camera provided with an optical system of a finder having a exclusive object lens different from a photo-taking lens and can achieve the same effect as that of the abovementioned second embodiment.

Figure 11:
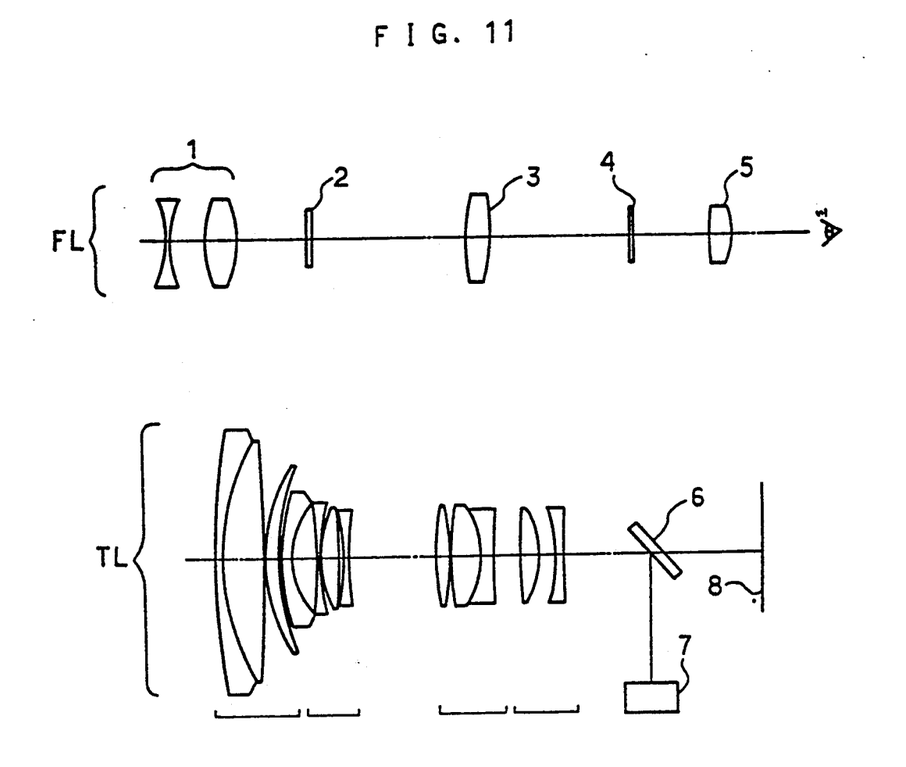
FIG. 11 shows an optical system of a third embodiment of a camera according to the present invention.

Now, an optical system of the third embodiment of a camera according to the present invention will be described in the following with reference to FIG. 11.

A photo-taking lens TL is a zoom lens of the so-called four component type. In addition to this photo-taking lens TL, a finder optical system FL separate from the photo-taking lens TL is provided. The finder optical system FL comprises an object lens 1 capable of a zooming operation, a device 2 for displaying a visual field frame and the focus detecting area which is provided in the focal point of the object lens 1, a relay lens 3 for turning over in the vertical and horizontal directions an inverted image formed on the abovementioned display device 2, an image forming plane 4 on which an image is re-formed by the relay lens 3, and an eyepiece 5.

Instead of the relay lens 3, another optical system such as a porro-prism may be used for turning over the inverted image in the vertical and horizontal directions.

Behind the photo-taking lens TL, there are provided a mirror 6 for guiding an incident light toward an AF sensor module 7 used for focus detection comprising a CCD or the like on which a bundle of rays separated and guided by the mirror 6 is incident, and a film plane positioned in the focal point of photo-taking lens TL.

Further, the position of the display device 2 for displaying the focus detecting area is not limited to the abovementioned but may be in the position of the image forming plane 4. The display device 2 is constructed to change the focus detecting area display and it may comprises a photoelectric element such as a LCD (Liquid Crystal Display) or an ECD (Electrochromic Display).

A control system of this embodiment of the camera is similar to that of the abovementioned first embodiment described with reference to FIG. 2. However, in this embodiment, a switch 23 is a switch for giving an instruction to select the focus detecting area enlarging mode.

Figure 12:
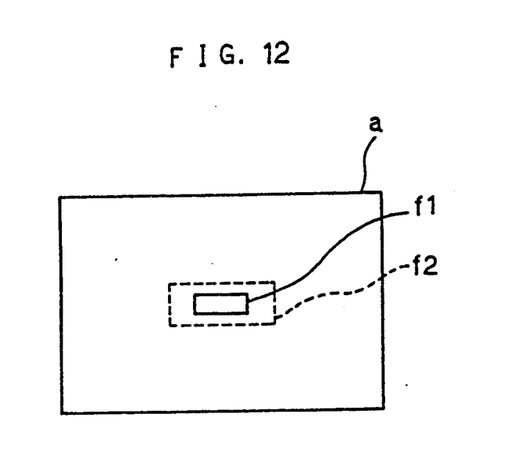
FIG. 12 shows the visual field frame and the focus detecting area seen through a finder of the third embodiment.

Now, the visual field frame and the focus detecting area seen through the abovementioned finder optical system FL will be described in the following with reference to FIG. 12. In the usual mode (not in the focus detecting area enlarging mode), the visual field frame "a" and the focus detecting area "f1" are displayed. In the focus detecting area enlarging mode, instead of the focus detecting area "f1" or together with the focus the focus detecting area "f1" is displayed. the focus detecting area "f1" is displayed.

Further, in the focus detecting area enlarging mode, before shutter releasing operation is executed, the photo-taking lens TL is set at a focal length so that its photographing range is larger than an area framed by the visual field frame "a" of the finder. The focus detecting operation is executed in this state with respect to the object in the focus detecting area "f2". After that, the photo-taking lens TL is set to the longer focal length in the zooming operation so that the photographing range of the photo-taking lens TL correspond to the area framed by the visual field frame "a", and photographing operation is executed. Therefore, the focus detecting area at the focus detecting time is larger than the focus detecting area "f1" at the photographing time.

The larger focus detecting area "f2" may be displayed only in the focus detecting area enlarging mode, or displayed at all times.

The relation of the focal length of the photographing lens TL, the local length range capable of photographing and the focal length range capable of being observed in the finder is the same as described with reference to FIG. 4.

In the focus detecting area enlarging mode, the finder magnification is enlarged similar to the second embodiment. This enlargement of the finder magnification is executed by the zooming operation of the object lens 1 of the finder optical system FL. When the object lens 1 is zoomed, the image formed on the display device 2 itself is enlarged and therefore, it is not necessary to display the inner visual field frame "e", unlike the case of the second embodiment described above with reference to FIGS. 6 to 8.

In the usual photographing mode, the object lens 1 of the finder optical system FL is zoomed in interlocked connection with the zooming operation of the photo-taking lens TL so that the view field of the finder optical system FL becomes equal to the photographing range of the photo-taking lens TL.

The sequence of the operation of this camera by means of the abovementioned CPU 11, AFCPU 12 and the like is similar to that of the second embodiment shown in FIG. 10. However, at step #10-1, the finder magnification is changed by the object lens 1 of the finder optical system FL, and further, at step #10-2, the enlarged focus detecting area "f2" is displayed on the display device 2. The execution at step #8, #9, #14 and #17 can be achieved by using a focal-plane shutter and also by a lens shutter.

Further, in the abovementioned sequence, the number of the enlargement ratio in the focus detecting area enlarging mode is not limited to one, but the size of the focus detecting area may changed in a plurality of number. In such a case, an enlargement ratio selecting step (not shown) is required just before at step #10-1.

What is claimed is:

1. A camera system having a photo-taking lens capable of zooming, comprising:
   focus detecting means for detecting a focus condition of the photo-taking lens using light passing through the photo-taking lens; and
   zooming means for automatically carrying out a zooming operation after the focus detecting operation is carried out by the focus detecting means, irrespective of the focus detecting result to shift the photo-taking lens with a predetermined amount in the direction toward the longest focal length from a preset focal length.

2. A camera system having a photo-taking lens capable of zooming, comprising:
   a release switch for directing the shutter release operation;
   zooming means for carrying out a zooming operation to shift the photo-taking lens by a predetermined amount in a direction toward the longest focal length in response to an operation of the release switch, and
   exposure means for exposing a film after the zooming operation is carried out by the zooming means.

3. A camera system having a photo-taking lens capable of zooming, comprising:
   a switch;
   zooming means for carrying out a zooming operation in response to an actuation of the switch to shift the photo-taking lens by a predetermined amount in a direction toward the longest focal length from a preset focal length;
   a viewfinder device, and
   indicating means for indicating ranges in the viewfinder, including first means for indicating a first range corresponding to a field of view for the preset focal length of the photo-taking lens in a viewfinder device, and second means for indicating a second range smaller than the first range in the viewfinder device, wherein the zooming means carries out the zooming operation until the field of view of the photo-taking lens corresponds to the second range.

4. A camera system claimed in claim 3, wherein the switch is a release switch for directing a shutter release operation.

5. A camera system as claimed in claim 4, wherein the second indicating means indicates the second range with an LCD (Liquid Crystal Display) device.

6. A camera system as claimed in claim 4, wherein the second indicating means indicates the second range with an ECD (Electrochromic Display) device. h 7. A camera system claimed in claim 3, further comprising:
   focus detecting means for detecting a focus condition of the photo-taking lens using light passing through the photo-taking lens;
   and wherein the focus detecting means detects the focus condition before the zooming operation is carried out by the zooming means.

8. A camera system claimed in claim 3, wherein the camera is a single-lens reflex camera.

9. A camera system claimed in claim 3, wherein the camera is a lens shutter camera having a viewfinder device separated from the photo-taking lens.

10. A camera system as claimed in claim 5, further comprising:
   third means for indicating a focus detection area in the viewfinder device, said focus detection area corresponding to an area in which the focus detecting means detects the focus condition.

11. A camera system as claimed in claim 10, wherein the third indicating means indicates the third range with an LCD (Electrochromic Display) device.

12. A camera system as claimed in claim 10, wherein the third indicating means indicates the third range with an ECD (Electrochromic Display) device.

13. A camera system having an objective lens capable of changing its focal length, comprising:
   a release switch for directing a shutter release operation;
   changing means for changing the focal length of the objective lens in response to an actuation of the release switch from a first focal length to a second focal length which is longer than the first focal length, and
   exposure means for exposing a film after the changing operation is carried out by the changing means.

14. A camera system having an objective lens capable of changing its focal length, comprising:
   a switch;
   changing means for changing the focal length of the objective lens in response to an actuation of the switch from a first focal length to a second focal length which is longer than the first focal length;
   a viewfinder device, and
   indicating means for indicating, in the viewfinder device, first and second ranges corresponding to fields of view for the first and second focal length, respectively, wherein the changing means carries out the changing operation until the field of view of the objective lens corresponds to the second range.

15. A camera system having an objective lens capable of changing its focal length, comprising:
   focus detecting means for detecting a focus condition of the objective lens using light passing through the objective lens; and
   changing means for automatically changing the focal length of the objective lens after the focus detecting operation is carried out by the focus detecting means, irrespective of the focus detecting result from a first focal length to a second focal length which is longer than the first focal length.

16. A camera system having a photo-taking lens capable of zooming, comprising:
   focus detecting means for detecting a focus condition of the photo-taking lens using light passing through the photo-taking lens;
   a release switch for directing the shutter release operation;
   judging means for judging whether or not the release switch is operated after the focus detecting operation is carried out by the focus detecting means;
   zooming means for automatically carrying out a zooming operation to shift the photo-taking lens by a predetermined amount in a direction toward the longest focal length when the judging means judges the release switch is operated; and
   exposure means for exposing a film after the zooming operation is carried out by the zooming means.

* * * * *